United States Patent
Yamada et al.

(10) Patent No.: US 9,324,013 B2
(45) Date of Patent: Apr. 26, 2016

(54) IMAGE USED COMMERCIAL GOODS CREATING APPARATUS, IMAGE USED COMMERCIAL GOODS CREATING METHOD, AND NON-TRANSITORY COMPUTER READABLE RECORDING MEDIUM

(71) Applicant: FUJIFILM Corporation, Tokyo (JP)

(72) Inventors: Daisuke Yamada, Tokyo (JP); Masaki Saito, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/564,632

(22) Filed: Dec. 9, 2014

(65) Prior Publication Data

US 2015/0161491 A1    Jun. 11, 2015

(30) Foreign Application Priority Data

Dec. 11, 2013    (JP) .................................. 2013-256063

(51) Int. Cl.
  *G06K 15/00*    (2006.01)
  *H04N 1/00*    (2006.01)
  *G06K 15/02*    (2006.01)
  *G06T 11/60*    (2006.01)

(52) U.S. Cl.
  CPC ........ *G06K 15/1885* (2013.01); *G06K 15/1868* (2013.01); *G06K 15/1878* (2013.01); *G06T 11/60* (2013.01); *H04N 1/00* (2013.01)

(58) Field of Classification Search
  None
  See application file for complete search history.

(56) References Cited

U.S. PATENT DOCUMENTS

| | | | |
|---|---|---|---|
| 6,580,824 B2 | 6/2003 | Deng et al. | |
| 6,741,722 B2 | 5/2004 | Abe | |
| 2005/0174349 A1* | 8/2005 | Watson | 345/427 |

FOREIGN PATENT DOCUMENTS

| | | |
|---|---|---|
| JP | 06-327670 | 11/1994 |
| JP | 2001-186326 | 7/2001 |
| JP | 2001-346798 | 12/2001 |
| JP | 2003-230018 | 8/2003 |
| JP | 2004-152315 | 5/2004 |
| JP | 2004-538555 | 12/2004 |
| JP | 2008-263710 | 10/2008 |
| JP | 2009-295041 | 12/2009 |

OTHER PUBLICATIONS

Japanese Official Action—JP2013-256063—Oct. 19, 2015.
Japanese Office Action dated Jan. 26, 2016 in corresponding Japanese Patent Application No. 2013-256063 with English language translation of Japanese Office Action.

* cited by examiner

*Primary Examiner* — Dov Popovici
(74) *Attorney, Agent, or Firm* — Young & Thompson

(57) ABSTRACT

An image used commercial goods creating apparatus and an image used commercial goods creating method that automatically create desired image used commercial goods using a processed image which a user has strong feelings about. Whether an image is a processed image obtained by processing an original image is judged. The content of processing of the image which is judged to be the processed image is judged. At least one of the arrangement and size of the processed image in image used commercial goods is determined on the basis of the content of processing of the processed image. The processed image is laid out on the basis of the determined at least one of the arrangement and size of the processed image to create the image used commercial goods.

11 Claims, 13 Drawing Sheets

FIG. 3

| CONTENT OF PROCESSING | | | IMAGE LAYOUT |
|---|---|---|---|
| TYPE OF PROCESSING | AMOUNT OF PROCESSING | (CONSIDERING TYPE OF IMAGE USED COMMERCIAL GOODS) | ARRANGEMENT AND SIZE |
| COLOR CORRECTION (PROCESS ONE IMAGE) EXAMPLE: SEPIA | LARGE (DARK SEPIA) | PHOTO BOOK | · ONLY ONE IMAGE IS ARRANGED ON PAGE<br>· ONLY ONE IMAGE IS ARRANGED ON DOUBLE-PAGE SPREAD |
| | | DIGITAL CAMERA PRINT | · SELECT LARGE SIZE<br>· WHITE BORDER IS ADDED |
| | | POSTCARD | · IMAGE IS USED AS ENTIRE BACKGROUND |
| | SMALL (LIGHT SEPIA) | POSTCARD | IMAGE IS USED AS ONE POINT |
| COLLAGE (PROCESS A PLURALITY OF IMAGES) | LARGE (LARGE NUMBER OF ORIGINAL IMAGES) | PHOTO BOOK | · IMAGE IS USED AS TITLE<br>· IMAGE IS ARRANGED ON ENTIRE PAGE<br>· IMAGE IS ARRANGED ON ENTIRE DOUBLE-PAGE SPREAD |
| | | DIGITAL CAMERA PRINT | · IMAGE WITHOUT BORDER IS USED |
| | | POSTCARD | · IMAGE IS USED AS ENTIRE BACKGROUND |
| | SMALL (SMALL NUMBER OF ORIGINAL IMAGES) | POSTCARD | · IMAGE IS USED AS ONE POINT |

DOUBLE-PAGE SPREAD

TITLE

FIG. 7A

| CONTENT OF PROCESSING | | | IMAGE LAYOUT | |
|---|---|---|---|---|
| TYPE OF PROCESSING | AMOUNT OF PROCESSING | DATE DIFFERENCE | | ARRANGEMENT AND SIZE (CONSIDERING TYPE OF IMAGE USED COMMERCIAL GOODS) |
| COLOR CORRECTION (PROCESS ONE IMAGE) EXAMPLE: SEPIA | LARGE (DARK SEPIA) | LARGE | PHOTO BOOK | · ONLY ONE IMAGE IS ARRANGED ON PAGE<br>· ONLY ONE IMAGE IS ARRANGED ON DOUBLE-PAGE SPREAD |
| | | | DIGITAL CAMERA PRINT | · SELECT LARGE SIZE<br>· WHITE BORDER IS ADDED |
| | | | POSTCARD | · IMAGE IS USED AS ENTIRE BACKGROUND |
| | | SMALL | PHOTO BOOK | |
| | | | DIGITAL CAMERA PRINT | |
| | | | POSTCARD | IMAGE IS USED AS ONE POINT |
| | SMALL (LIGHT SEPIA) | LARGE | PHOTO BOOK | |
| | | | DIGITAL CAMERA PRINT | |
| | | | POSTCARD | |
| | | SMALL | PHOTO BOOK | |
| | | | DIGITAL CAMERA PRINT | |
| | | | POSTCARD | |

FIG. 7B

| CONTENT OF PROCESSING | | | | IMAGE LAYOUT | |
|---|---|---|---|---|---|
| TYPE OF PROCESSING | AMOUNT OF PROCESSING | DATE DIFFERENCE | | ARRANGEMENT AND SIZE (CONSIDERING TYPE OF IMAGE USED COMMERCIAL GOODS) | |
| COLLAGE (PROCESS A PLURALITY OF IMAGES) | LARGE (LARGE NUMBER OF ORIGINAL IMAGES) | LARGE | PHOTO BOOK | · IMAGE IS USED AS TITLE<br>· IMAGE IS ARRANGED ON ENTIRE PAGE<br>· IMAGE IS ARRANGED ON ENTIRE DOUBLE-PAGE SPREAD | |
| | | | DIGITAL CAMERA PRINT | · IMAGE WITHOUT BORDER IS USED | |
| | | | POSTCARD | · IMAGE IS USED AS ENTIRE BACKGROUND | |
| | | SMALL | PHOTO BOOK | | |
| | | | DIGITAL CAMERA PRINT | | |
| | | | POSTCARD | | |
| | SMALL (SMALL NUMBER OF ORIGINAL IMAGES) | LARGE | PHOTO BOOK | | |
| | | | DIGITAL CAMERA PRINT | | |
| | | | POSTCARD | · IMAGE IS USED AS ONE POINT | |
| | | SMALL | PHOTO BOOK | | |
| | | | DIGITAL CAMERA PRINT | | |
| | | | POSTCARD | | |

IMAGE USED COMMERCIAL GOODS CREATING APPARATUS, IMAGE USED COMMERCIAL GOODS CREATING METHOD, AND NON-TRANSITORY COMPUTER READABLE RECORDING MEDIUM

CROSS-REFERENCE TO RELATED APPLICATIONS

The present application claims priority under 35 U.S.C. §119 to Japanese Patent Application No. 2013-256063, filed on Dec. 11, 2013, all of which are hereby expressly incorporated by reference into the present application.

BACKGROUND OF THE INVENTION

1. Field of the Invention

The present invention relates to an image used commercial goods creating apparatus, an image used commercial goods creating method, an image used commercial goods creating program, and a non-transitory recording medium storing the image used commercial goods creating program that create image used commercial goods using a processed image.

In addition, the present invention relates to a processed image judging apparatus, a processed image judging method, a processed image judging program, and a non-transitory recording medium storing the processed image judging program that judge whether an image is a processed image and judges the content of processing of the processed image.

2. Description of the Related Art

For example, an image used commercial goods creating apparatus and an image used commercial goods creating method have been known which create image used commercial goods, such as photo books, collages, or postcards, using image data. In addition, a method is considered which uses a processed image to create the image used commercial goods. For example, JP1994-327670A (JP-H06-327670A) discloses a candidate image display method and device which replaces an image inserted into a mount with another desired image and also discloses a structure which creates an album on the basis of the candidate image display method and device.

JP2001-346798A discloses an album creating apparatus and an album creating method which correct a plurality of images captured by, for example, a digital camera and arrange the corrected images in a layout frame to create an album.

JP2008-263710A discloses a composite image creating apparatus which gives priorities to a plurality of user images and arranges the user images on a template on the basis of the priorities to generate a composite image.

SUMMARY OF THE INVENTION

When image used commercial goods are created, images which hold memories for the user and in which the user's feelings are reflected are preferably used in the image used commercial goods. In addition, the processed image which is carefully processed by the user is considered as the image in which the user's feelings are reflected.

JP1994-327670A (JP-H06-327670A) discloses the structure in which the user performs an operation to create the image used commercial goods in which the user's intention is reflected. However, the user needs to directly change the layout of the images in the image used commercial goods in order to reflect the user's intention.

The technique disclosed in JP2001-346798A can automatically create the album in which the images of a conspicuous main object are arranged, but is configured on the assumption that there is no image with desired characteristics and is not capable of creating the album in which the user's feelings about the image are reflected.

JP2008-263710A discloses the structure which analyzes images to judge the content of the images and lays out the images. However, the image used commercial goods which are created in this way are not necessarily the image used commercial goods in which the user's feelings about the image are appropriately reflected.

An object of the invention is to provide an image used commercial goods creating apparatus, an image used commercial goods creating method, an image used commercial goods creating program, and a non-transitory recording medium storing the image used commercial goods creating program that automatically create desired image used commercial goods using a processed image which a user has strong feelings about.

In addition, an object of the invention is to provide a processed image judging apparatus, a processed image judging method, a processed image judging program, and a non-transitory recording medium storing the processed image judging program which judge whether an image is a processed image that a user has strong feelings about and judge the content of processing of the processed image in order to judge how strong the user's feelings about the processed image are, when the image is the processed image.

In order to solve the above-mentioned problems, according to an aspect of the invention, there is provided an image used commercial goods creating apparatus including: a processed image judging unit that judges whether an image using in image used commercial goods is a processed image; a content of processing judging unit that judges content of processing of the image which is judged to be the processed image by the processed image judging unit; an arrangement and size determination unit that determines at least one of the arrangement and size of the processed image in the image used commercial goods on the basis of the content of processing judged by the content of processing judging unit; and an image layout unit that lays out the processed image on the basis of the at least one of the arrangement and size of the processed image determined by the arrangement and size determination unit to create the image used commercial goods.

The content of processing may include a processing type of the processed image and an amount of processing of an original image of the processed image.

The arrangement and size determination unit may determine the at least one of the arrangement and size of the processed image on the basis of the content of processing and a date difference which is a difference between a capture date and time of an original image of the processed image and a processing date and time of the processed image.

The image used commercial goods creating apparatus according to the above-mentioned aspect of the invention may further include a display unit that displays the created image used commercial goods or an output unit that prints the created image used commercial goods.

The image used commercial goods may be photo books, digital camera prints, or postcards.

According to another aspect of the invention, there is provided a processed image judging apparatus including: a processed image judging unit that judges whether an image is a processed image; a content of processing judging unit that judges content of processing of the image which is judged to be the processed image by the processed image judging unit;

and a content of processing display unit that displays the content of processing judged by the content of processing judging unit.

The content of processing display unit may display the content of processing and the processed image.

According to still another aspect of the invention, there is provided an image used commercial goods creating method comprising: judging whether an image using in image used commercial goods is a processed image obtained by processing an original image; judging content of processing of the image which is judged to be the processed image; determining at least one of the arrangement and size of the processed image in the image used commercial goods on the basis of the content of processing of the processed image; and laying out the processed image on the basis of the determined at least one of the arrangement and size of the processed image to create the image used commercial goods.

The content of processing may include a processing type of the processed image and an amount of processing of the original image of the processed image.

The at least one of the arrangement and size of the processed image may be determined on the basis of the content of processing and a date difference which is a difference between a capture date and time of the original image of the processed image and a processing date and time of the processed image.

The image used commercial goods may be photo books, digital camera prints, or postcards.

According to yet still another aspect of the invention, there is provided a processed image judging method including: judging whether an image is a processed image; judging content of processing of the image which is judged to be the processed image; and displaying the judged content of processing.

The content of processing and the processed image may be displayed.

According to yet still another aspect of the invention, there is provided an image used commercial goods creating program that causes a computer to perform the above-mentioned image used commercial goods creating method.

According to yet still another aspect of the invention, there is provided a processed image judging program that causes a computer to perform the above-mentioned processed image judging method.

According to yet still another aspect of the invention, there is provided a non-transitory computer-readable recording medium storing the image used commercial goods creating program.

According to yet still another aspect of the invention, there is provided a non-transitory computer-readable recording medium storing the processed image judging program.

According to the invention, it is judged whether an image is a processed image and the content of processing of the processed image is judged when the image is the processed image. Therefore, it is possible to appropriately judge user's feelings about the processed image. In addition, it is possible to automatically create desired image used commercial goods in which the user's feelings about an image are appropriately reflected, using the processed image.

BRIEF DESCRIPTION OF THE DRAWINGS

FIG. 3 shows an example of a table that defines a correspondence relationship between the content of processing of a processed image and an image layout.

FIGS. 7A and 7B show examples of a table that defines a correspondence relationship among the content of processing of a processed image, the date difference, and an image layout.

DESCRIPTION OF THE PREFERRED EMBODIMENTS

Hereinafter, image used commercial goods creating apparatuses and image used commercial goods creating methods according to preferred embodiments of the invention will be described in detail with reference to the accompanying drawings.

Embodiment 1

Figure 1:
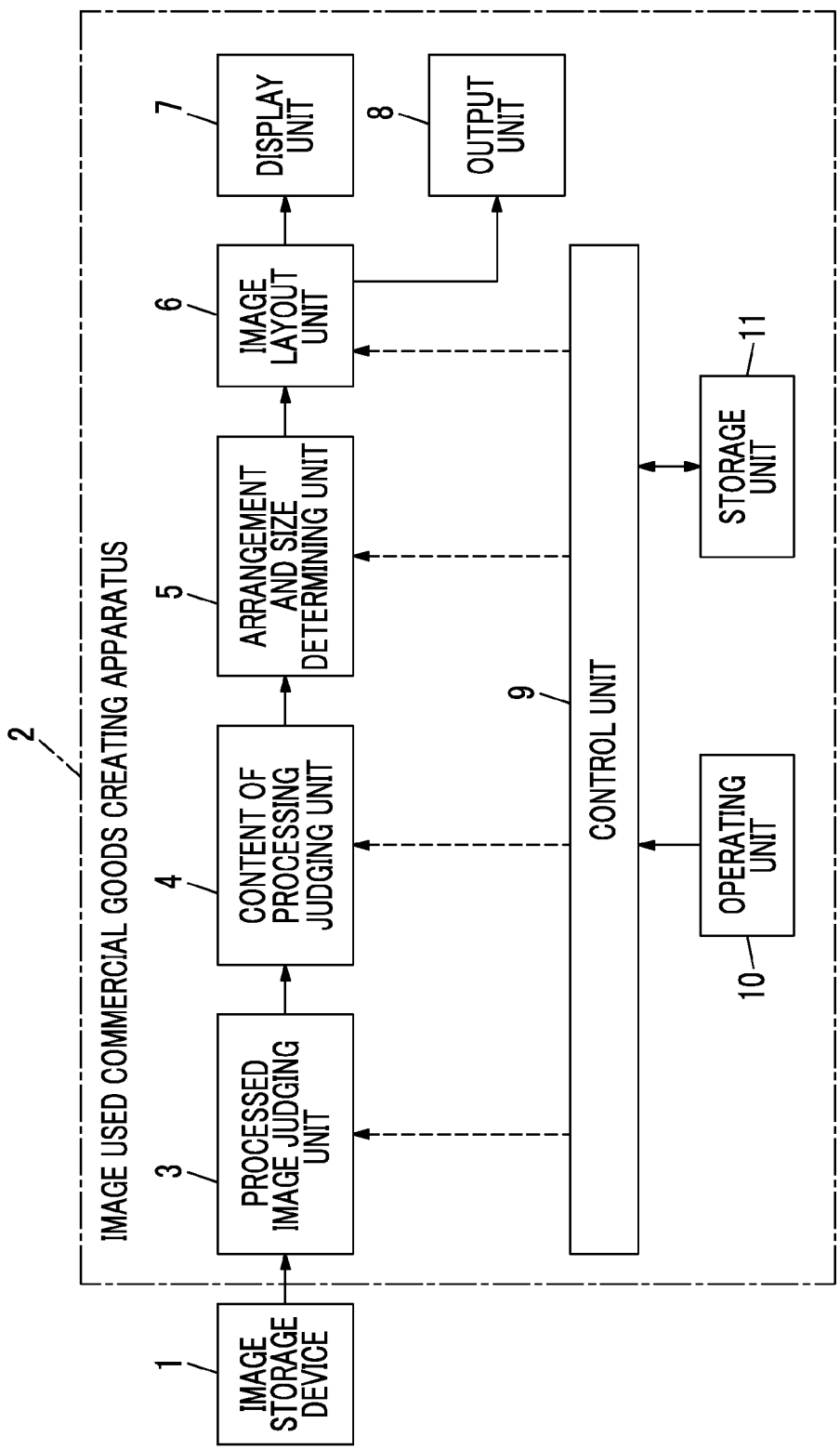
FIG. 1 is a block diagram illustrating an image used commercial goods creating system including an image used commercial goods creating apparatus according to Embodiment 1 of the invention.

FIG. 1 is a block diagram illustrating the entire structure of an image used commercial goods creating system including an image used commercial goods creating apparatus according to Embodiment 1 of the invention. The image used commercial goods creating system shown in FIG. 1 includes an image storage device 1 and an image used commercial goods creating apparatus 2 which is connected to the image storage device 1.

The image storage device 1 stores a plurality of image data items used in image used commercial goods and is, for example, an HDD or a flash memory. The image storage device 1 may be an image data server which is installed on the Internet or it may store a plurality of image data items which are uploaded through the Internet. The plurality of image data items stored in the image storage device 1 are classified into, for example, at least one image data group. The image data groups may be classified according to, for example, an imaging period and a photographer or they may be classified on the basis of the similarity of images by, for example, image analysis. In addition, the image data groups may be classified by the user.

The image used commercial goods creating apparatus 2 creates the image used commercial goods on the basis of the image data. Here, the image used commercial goods are, for example, photo books, postcards, and digital camera prints and the use of the image used commercial goods may be free or charged. In Embodiment 1, the image used commercial goods to be created are predetermined.

The image used commercial goods creating apparatus 2 includes a processed image judging unit 3, a content of processing judging unit 4, an arrangement and size determination unit 5, and an image layout unit 6 which are sequentially connected, and a display unit 7 and an output unit 8 which are connected to the image layout unit 6. In addition, the image used commercial goods creating apparatus 2 includes a control unit 9 which is connected to the processed image judging unit 3, the content of processing judging unit 4, the arrangement and size determination unit 5, and the image layout unit 6 and an operating unit 10 and a storage unit 11 which are connected to the control unit 9.

The processed image judging unit 3 acquires the image data from the image storage device 1 and judges whether the acquired image data is processed image data which has been processed by, for example, the user or unprocessed original image data. For example, the acquisition of the image data by the processed image judging unit 3 is performed as follows: the user designates at least one image data group in the image storage device 1 and image data in the designated image group is acquired. The processed image judging unit 3 may judge whether the acquired image data is the processed image data or the original image data on the basis of, for example, whether meta information which is stored together with the image data so as to be associated with the image data is present or absent or the content of the meta information. In addition, the judgment may be performed on the basis of, for example, the size, aspect ratio, and color of the image based on the image data.

The content of processing judging unit 4 judges the content of processing of the processed image data. The content of processing is classified into a processing type and the amount of processing. Examples of the processing type include color processing for changing the original image into a processed image with a sepia tone, collage for integrating a plurality of original images into one processed image, trimming for cutting a portion of the original image to form a processed image, rotation for changing the display direction of the original image to form a processed image, red eye correction for correcting red eye, edge enhancement for enhancing a contour, brightness and contrast correction for adjusting brightness and/or contrast, and combinations of them. Examples of the amount of processing include the tone of a color when the processing type is color processing, the number of original images when the processing type is collage, the area ratio of the processed image to the original image when the processing type is trimming, the angle of rotation or the number of rotations when the processing type is rotation, the number of red eye corrections when the processing type is red eye correction, the degree of edge enhancement when the processing type is edge enhancement, and a variation in brightness and contrast when the processing type is brightness and/or contrast correction. When the processing types are combined, for example, the amount of processing in each processing type may be calculated to judge the amount of processing of the entire processed image.

The arrangement and size determination unit 5 determines at least one of the arrangement and size of the processed image in the image used commercial goods on the basis of the content of processing judged by the content of processing judging unit 4. Here, the arrangement means the arrangement of the image relative to a mount in the image used commercial goods and the size means the area ratio of the image to the mount in the image used commercial goods. The mount means the background of the image used commercial goods in which the image is arranged.

The image layout unit 6 lays out the processed image on the mount of the image used commercial goods on the basis of the at least one of the arrangement and size determined by the arrangement and size determination unit 5 to create image used commercial goods data.

The display unit 7 is, for example, a liquid crystal display and displays the image used commercial goods data created by the image layout unit 6 as image used commercial goods on a display screen.

The output unit 8 is, for example, a printer and prints the image used commercial goods data created by the image layout unit 6 on a medium, such as paper, to create the image used commercial goods.

The control unit 9 controls the processed image judging unit 3, the content of processing judging unit 4, the arrangement and size determination unit 5, and the image layout unit 6 and controls the overall operation of the image used commercial goods creating apparatus 2.

The operating unit 10 operates each unit of the image used commercial goods creating apparatus 2 through the control unit 9 in response to an instruction from the user. The storage unit 11 stores control programs for each unit or information about, for example, the image layout or the mount of the image used commercial goods and outputs the information to the image used commercial goods creating apparatus 2 in response to an instruction from the control unit 9.

Figure 2:
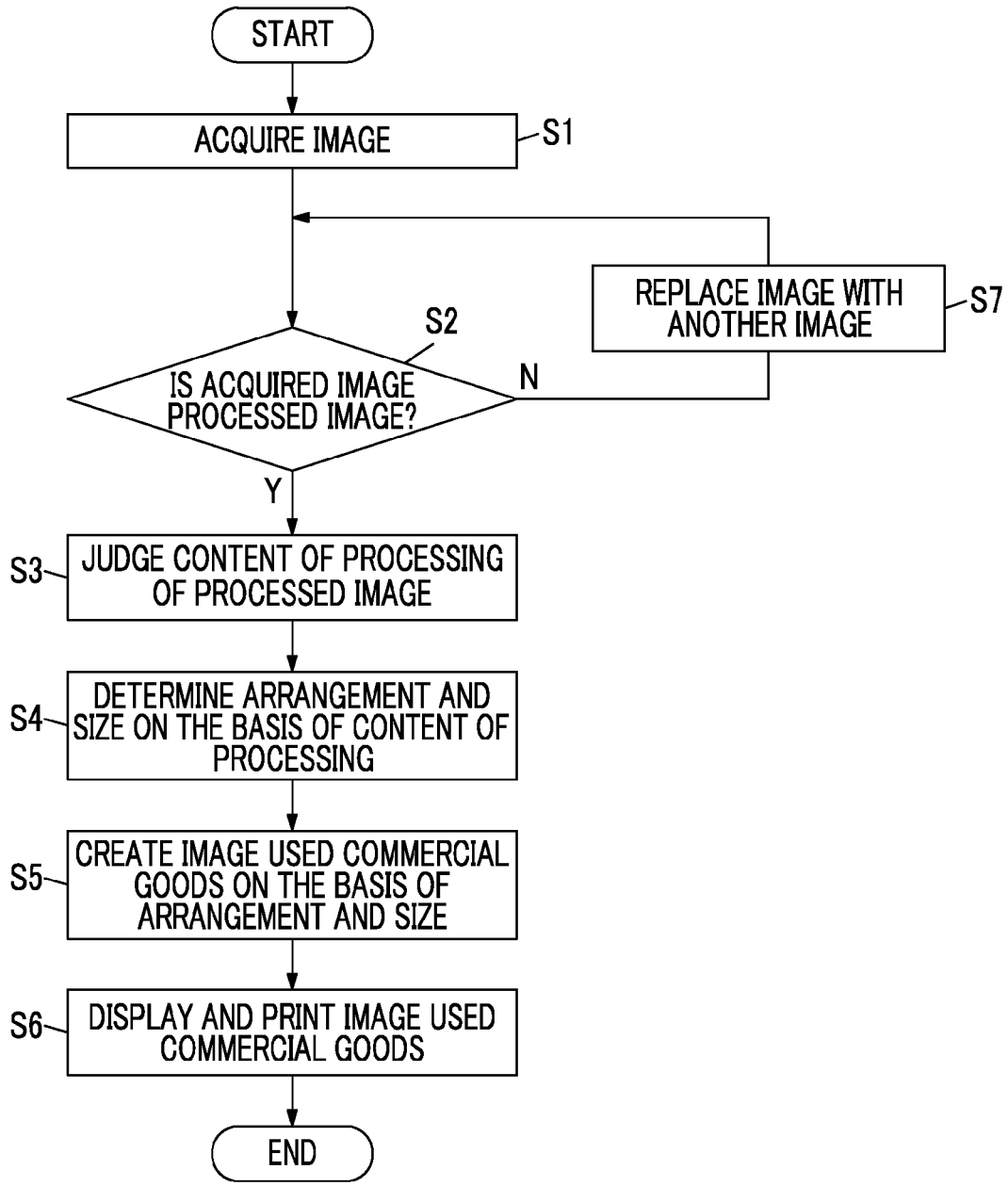
FIG. 2 is a flowchart illustrating an image used commercial goods creating flow of the image used commercial goods creating apparatus shown in FIG. 1.

Next, the operation of the image used commercial goods creating system shown in FIG. 1 will be described with reference to the flowchart shown in FIG. 2.

First, in Step S1, the image used commercial goods creating apparatus 2 acquires image data in at least one image data group which is designated by the user from a plurality of image data items stored in the image storage device 1. The image storage device 1 stores the unprocessed original image data and the processed image data which are mixed with each other and the image data group includes the original image data and the processed image data which are mixed with each other. Each image data item stored in the image storage device 1 may include meta information, such as Exif, in which, for example, capture date and time, processing date and time, and content of processing are described, or it may not include the meta information. The image storage device 1 may store only the meta information as another data item which is associated with the image data.

Then, in Step S2, the processed image judging unit 3 of the image used commercial goods creating apparatus 2 judges whether each image data item acquired by the image storage device 1 is unprocessed original image data or processed image data. The judgment whether the image data is the original image data or the processed image data may be performed on the basis of, for example, whether the meta information of the image data is present or absent, the content of the meta information, or the image data. For example, image data without meta information can be judged to be image data from which meta information has been removed during processing. Therefore, the image data without meta information can be judged to be the processed image data.

When the content of processing is described in the meta information, the image data can be judged to be the processed image data on the basis of the content of processing. For example, when the aspect ratio of the image based on the image data is different from that of a general image or when the image has one color, the image data can be judged to be the processed image data.

When the judged image data is the processed image data, the processed image judging unit 3 outputs the image data to the content of processing judging unit 4 in response to an instruction from the control unit 9. When the judged image data is the original image data, the processed image judging unit 3 replaces the image data with another image data item in Step S7 and determines whether the replaced image data is the processed image data in Step S2, in response to an instruction from the control unit 9. When all of the image data items in the acquired image data group are the original image data, another image data group may be acquired from the image storage device 1.

Then, in Step S3, the content of processing judging unit 4 judges the content of processing of the processed image data output from the processed image judging unit 3. As described above, the content of processing is classified into the processing type and the amount of processing and the amount of processing varies depending on the processing type. Therefore, first, the content of processing judging unit 4 judges the processing type of the processed image data. The content of processing judging unit 4 judges the processing type, such as color processing, collage, trimming, rotation, red eye correction, edge enhancement, or brightness and/or contrast correction, on the basis of the content of processing described in the meta information of the processed image data. However, the information used to judge the processing type is not limited to the meta information of the processed image data. The processing type may be judged from the image using, for example, image recognition.

Then, the content of processing judging unit 4 judges the amount of processing of the processed image on the basis of the judged processing type. When the processing type is color processing, the amount of processing is judged on the basis of, for example, the tone of sepia. For example, when sepia has a dark tone, it is judged that the amount of processing is large. When sepia has a light tone, it is judged that the amount of processing is small. When the processing type is processing for a plurality of images, for example, collage processing, the amount of processing is judged on the basis of the number of original images used for a collage. For example, when the number of original images is large, it is judged that the amount of processing is large. When the number of original images is small, it is judged that the amount of processing is small.

The processed image data and the content of processing judged by the content of processing judging unit 4 are output to the arrangement and size determination unit 5 in response to an instruction from the control unit 9.

In Step S4, the arrangement and size determination unit 5 determines at least one of the arrangement and size of the processed image on the basis of the content of processing output from the content of processing judging unit 4. Specifically, the arrangement and size determination unit 5 includes a layout table in which the correspondence between the content of processing and the image layout shown in FIG. 3 is recorded and determines at least one of the arrangement and size of the processed image according to the processing type and amount of processing of the processed image and the type of image used commercial goods to be created, on the basis of the layout table.

Figure 4A:
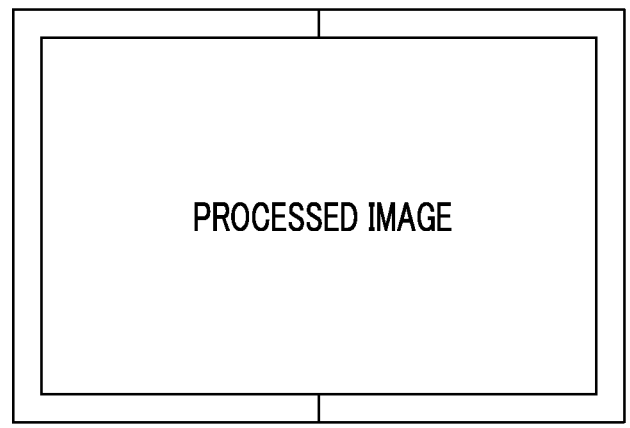
FIGS. 4A and 4B are schematic diagrams illustrating examples of image used commercial goods created by the image used commercial goods creating apparatus according to the invention.
Figure 4B:
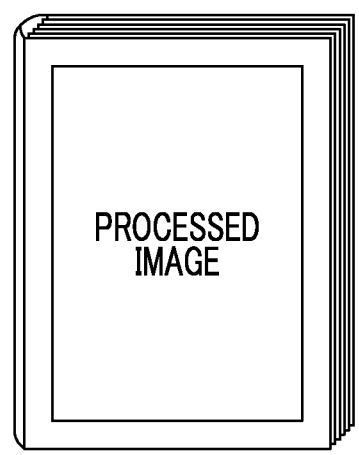

When the image used commercial goods to be created are photo books, the processing type is processing for one image, and the amount of processing is large, for example, the arrangement and size determination unit 5 determines the arrangement and size of the processed image such that only one processed image is arranged on a double-page spread, as shown in FIG. 4A. When the processing type is processing for a plurality of images and the amount of processing is large, for example, the arrangement and size determination unit 5 determines the arrangement and size of the processed image such that the processed image is used as the title of the photo book as shown in FIG. 4B.

Information about the at least one of the arrangement and size of the processed image determined by the arrangement and size determination unit 5 is output together with the processed image data to the image layout unit 6 in response to an instruction from the control unit 9.

Then, in Step S5, the image layout unit 6 lays out the processed image on the basis of the information about the at least one of the arrangement and size of the processed image output from the arrangement and size determination unit 5 and the processed image data to create the image used commercial goods. Data for the created image used commercial goods is output to the display unit 7 and the output unit 8 in response to an instruction from the control unit 9.

Finally, in Step S6, the display unit 7 displays the image used commercial goods on the basis of the data for the image used commercial goods output from the image layout unit 6. The output unit 8 prints the image used commercial goods on, for example, a paper medium on the basis of the data for the image used commercial goods.

As described above, the image used commercial goods creating apparatus according to Embodiment 1 uses the processed image in the image used commercial goods on the basis of the content of processing. Therefore, it is possible to automatically create desired image used commercial goods in which the user's feelings about the image are appropriately reflected.

Embodiment 2

In Embodiment 1, the arrangement and size determination unit 5 determines at least one of the arrangement and size of the processed image on the basis of the content of processing. However, for example, when the capture date and time of the original image of the processed image and the processing date and time of the processed image are known from the meta information in the processed image data, at least one of the arrangement and size of the processed image may be determined, further considering a date difference between the capture date and time and the processing date and time.

Figure 5:
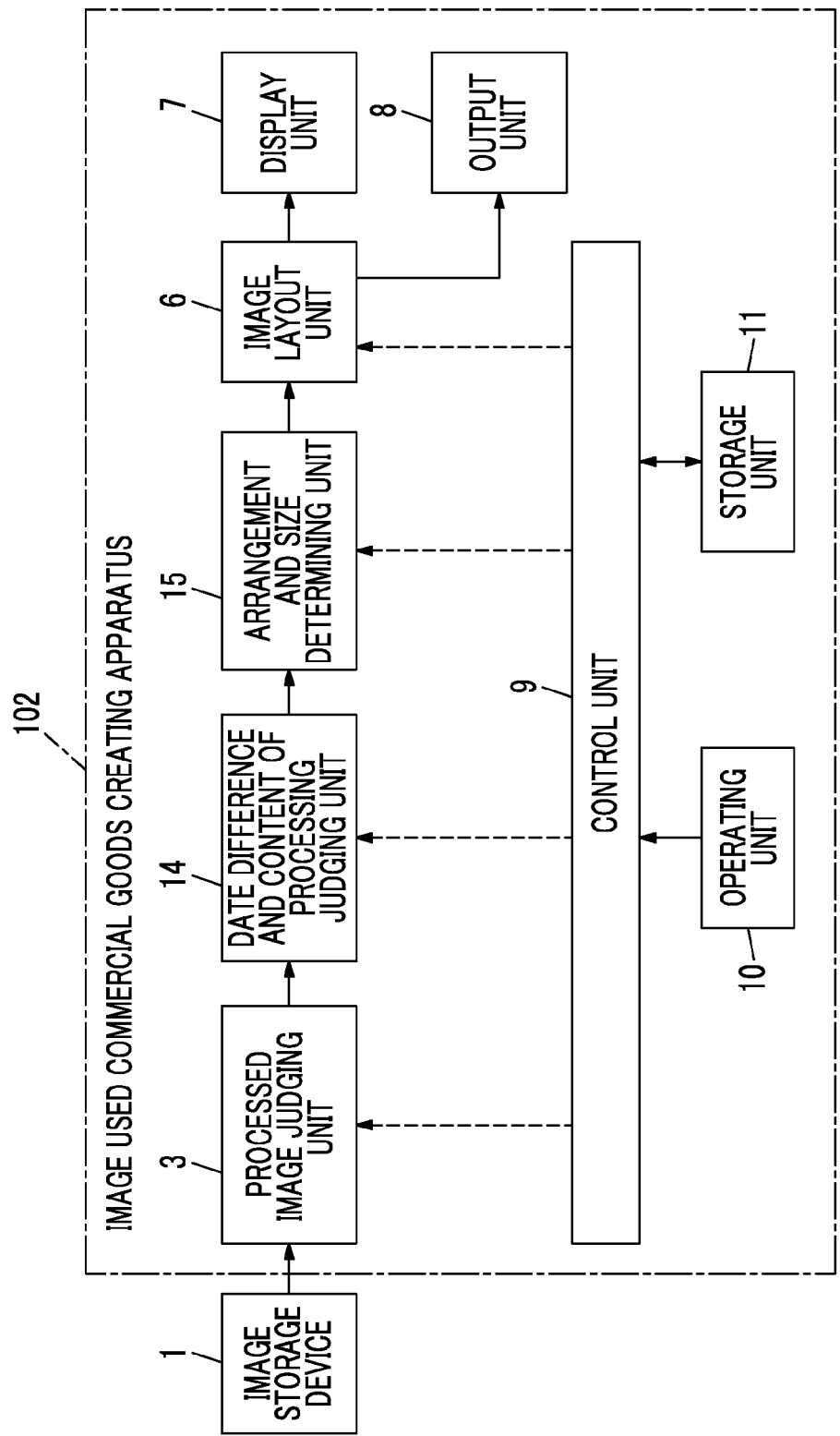
FIG. 5 is a block diagram illustrating an image used commercial goods creating system including an image used commercial goods creating apparatus according to Embodiment 2 of the invention.

FIG. 5 shows an image used commercial goods creating system including an image used commercial goods creating apparatus according to Embodiment 2 of the invention. An image used commercial goods creating apparatus 102 according to Embodiment 2 differs from the image used commercial goods creating apparatus 2 according to Embodiment 1 shown in FIG. 1 in that a date difference and content of processing judging unit 14 and an arrangement and size determination unit 15 are respectively used instead of the content of processing judging unit 4 and the arrangement and size determination unit 5. Since a processed image judging unit 3, an image layout unit 6, a display unit 7, an output unit 8, a control unit 9, an operating unit 10, and a storage unit 11 have the same structures as those in Embodiment 1, the description thereof will not be repeated. The date difference and content of processing judging unit 14 and the arrangement and size determination unit 15, which are differences from Embodiment 1, will be described.

The date difference and content of processing judging unit 14 judges a date difference which is a difference between the capture date and time of the original image of the processed image and the processing date and time of the processed image, in addition to the judgment of the content of processing of the processed image data by the content of processing judging unit 4 according to Embodiment 1, and outputs the content of processing and the date difference to the arrangement and size determination unit 15.

The arrangement and size determination unit 15 determines at least one of the arrangement and size of the processed image in the image used commercial goods on the basis of the content of processing and the date difference judged by the date difference and content of processing judging unit 14.

Next, the operation of the image used commercial goods creating system according to the invention shown in FIG. 5 will be described. As described above, Embodiment 2 differs from Embodiment 1 in the operation of the date difference and content of processing judging unit 14 and the arrangement and size determination unit 15.

The date difference and content of processing judging unit 14 judges the date difference and the content of processing of the processed image data which is output from the processed image judging unit 3. Since the judgment of the content of processing is the same as that in Embodiment 1, the description thereof will not be repeated.

Figure 6:
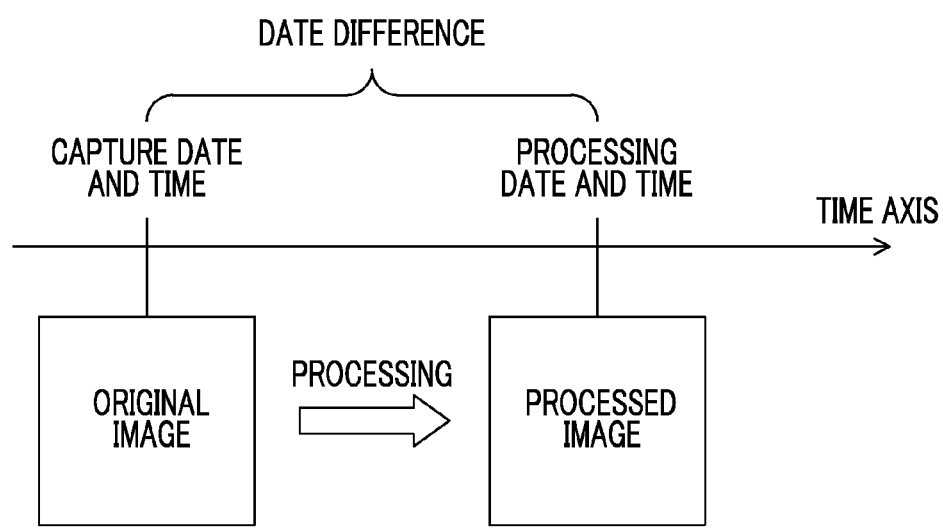
FIG. 6 is a diagram illustrating a date difference used in the image used commercial goods creating apparatus according to Embodiment 2.

As shown in FIG. 6, the date difference and content of processing judging unit 14 judges the date difference on the basis of, for example, the capture date and time and the processing date and time of the original image recorded in the meta information of the processed image data.

The date difference judged by the date difference and content of processing judging unit 14 is output together with the content of processing and the processed image data to the arrangement and size determination unit 15 in response to an instruction from the control unit 9.

The arrangement and size determination unit 15 determines at least one of the arrangement and size of the processed image on the basis of the date difference and the content of processing output from the date difference and content of processing judging unit 14. Specifically, the arrangement and size determination unit 15 includes a layout table in which the correspondence among the content of processing, the date difference, and the image layout shown in FIGS. 7A and 7B is recorded and determines at least one of the arrangement and size of the processed image according to the date difference, the processing type and amount of processing of the processed image, and the type of image used commercial goods to be created, on the basis of the layout table.

Information about the at least one of the arrangement and size of the processed image determined by the arrangement and size determination unit 15 is output together with the processed image data to the image layout unit 6 in response to an instruction from the control unit 9.

As described above, the image used commercial goods creating apparatus according to Embodiment 2 can use the processed image for the image used commercial goods, considering the date difference, in addition to the content of processing. Therefore, it is possible to automatically create desired image used commercial goods in which the user's feelings about the image are appropriately reflected.

Embodiment 3

In Embodiments 1 and 2, only the use of the processed image has been described above. In the image storage device 1, unprocessed original image data and processed image data are mixed with each other. For example, when image used commercial goods using a plurality of images, such as photo books, are created, the original image may be used together with the processed image.

Figure 8:
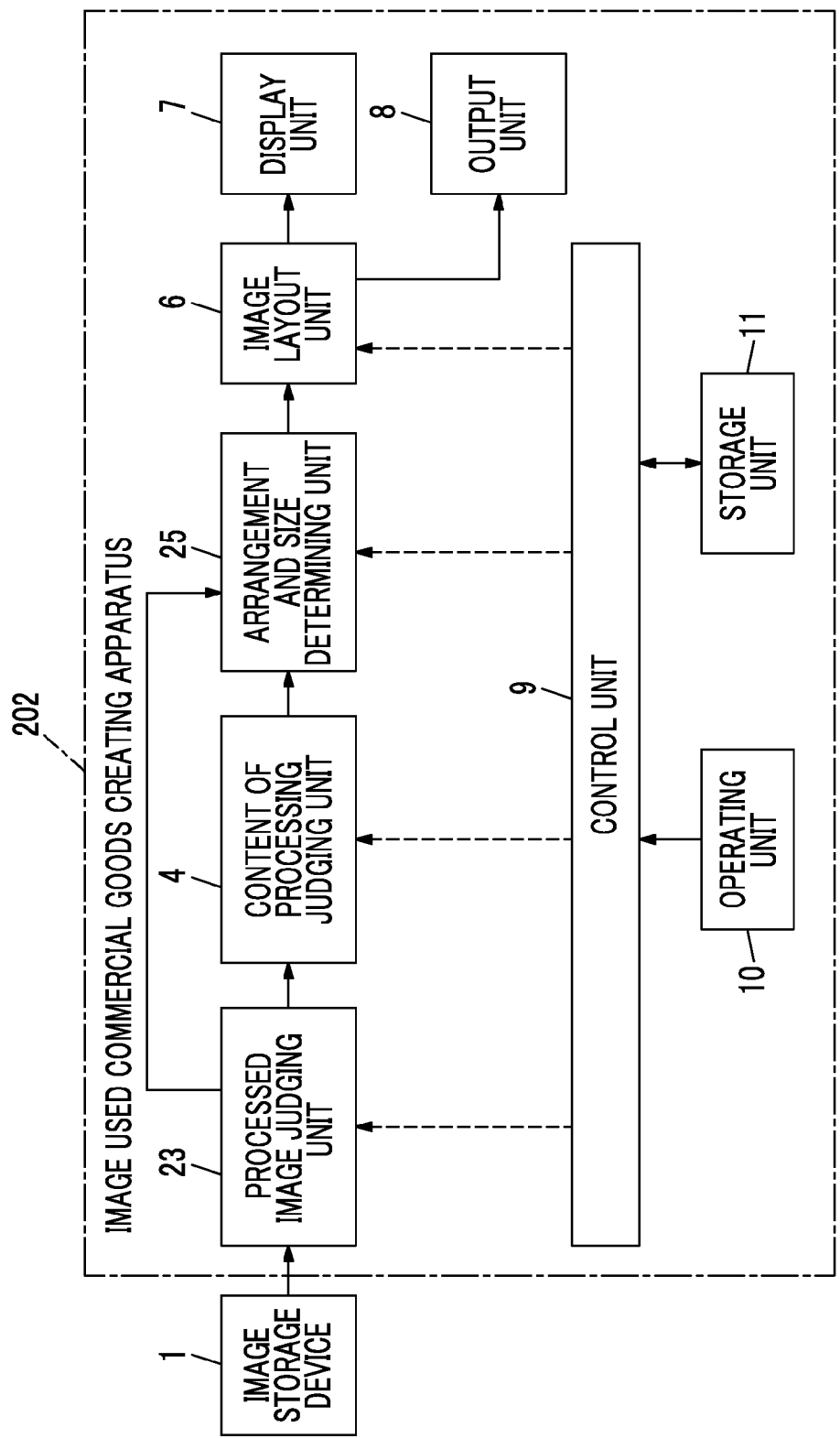
FIG. 8 is a block diagram illustrating an image used commercial goods creating system including an image used commercial goods creating apparatus according to Embodiment 3 of the invention.

FIG. 8 shows an image used commercial goods creating system including an image used commercial goods creating apparatus according to Embodiment 3 of the invention. An image used commercial goods creating apparatus 202 according to Embodiment 3 differs from the image used commercial goods creating apparatus 2 according to Embodiment 1 shown in FIG. 1 in that a processed image judging unit 23 and an arrangement and size determination unit 25 are respectively used instead of the processed image judging unit 3 and the arrangement and size determination unit 5. Since a content of processing judging unit 4, an image layout unit 6, a display unit 7, an output unit 8, a control unit 9, an operating unit 10, and a storage unit 11 have the same structures as those according to Embodiment 1, the description thereof will not be repeated. The processed image judging unit 23 and the arrangement and size determination unit 25, which are differences from Embodiment 1, will be described.

The processed image judging unit 23 acquires image data from an image storage device 1. Then, the processed image judging unit 23 judges whether the acquired image data is processed image data which has been processed by, for example, the user or unprocessed original image data. The process of the processed image judging unit 23 judging whether the acquired image data is the processed image data or the original image data is the same as that of the processed image judging unit 3 according to Embodiment 1. The processed image judging unit 23 outputs the processed image data to the content of processing judging unit 4 and outputs the original image data to the arrangement and size determination unit 25.

Similarly to the arrangement and size determination unit 5 according to Embodiment 1, the arrangement and size determination unit 25 determines at least one of the arrangement and size of the processed image in the image used commercial goods and determines at least one of the arrangement and size of the original image data output from the processed image judging unit 23, on the basis of the content of processing judged by the content of processing judging unit 4.

Figure 9:
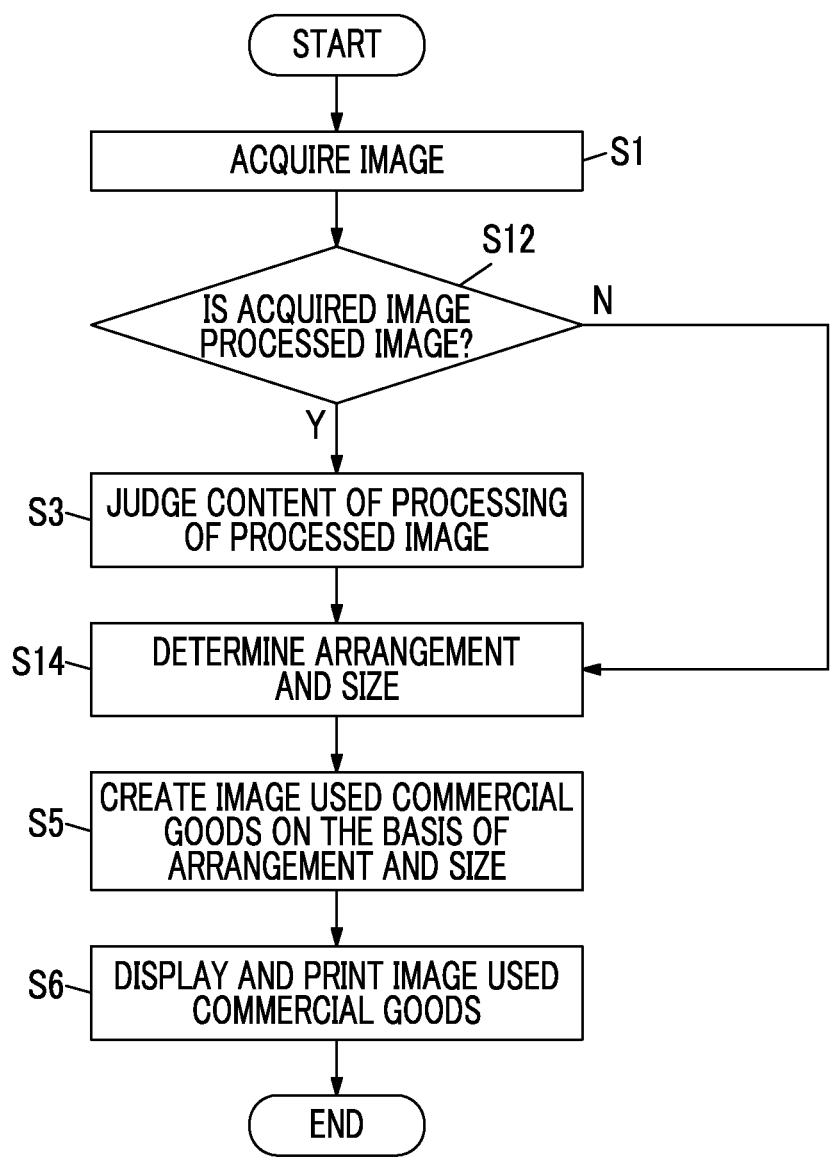
FIG. 9 is a flowchart illustrating an image used commercial goods creating flow of the image used commercial goods creating apparatus shown in FIG. 8.

Next, the operation of the image used commercial goods creating system shown in FIG. 8 will be described with reference to the flowchart shown in FIG. 9. As described above, differences from Embodiment 1 are the operation of the processed image judging unit 23 and the arrangement and size determination unit 25 and differences from the flowchart shown in FIG. 2 are Step S12 and Step S14.

In Step S12, the processed image judging unit 23 acquires image data from the image storage device 1 in response to an instruction from the control unit 9 and judges whether the acquired image data is the original image data or the processed image data. When the acquired image data is the processed image data, the processed image judging unit 23 outputs the processed image data to the content of processing judging unit 4, similarly to the processed image judging unit 3 according to Embodiment 1. When the acquired image data is the original image data, the processed image judging unit 23 outputs the original image data to the arrangement and size determination unit 25.

Figure 10:
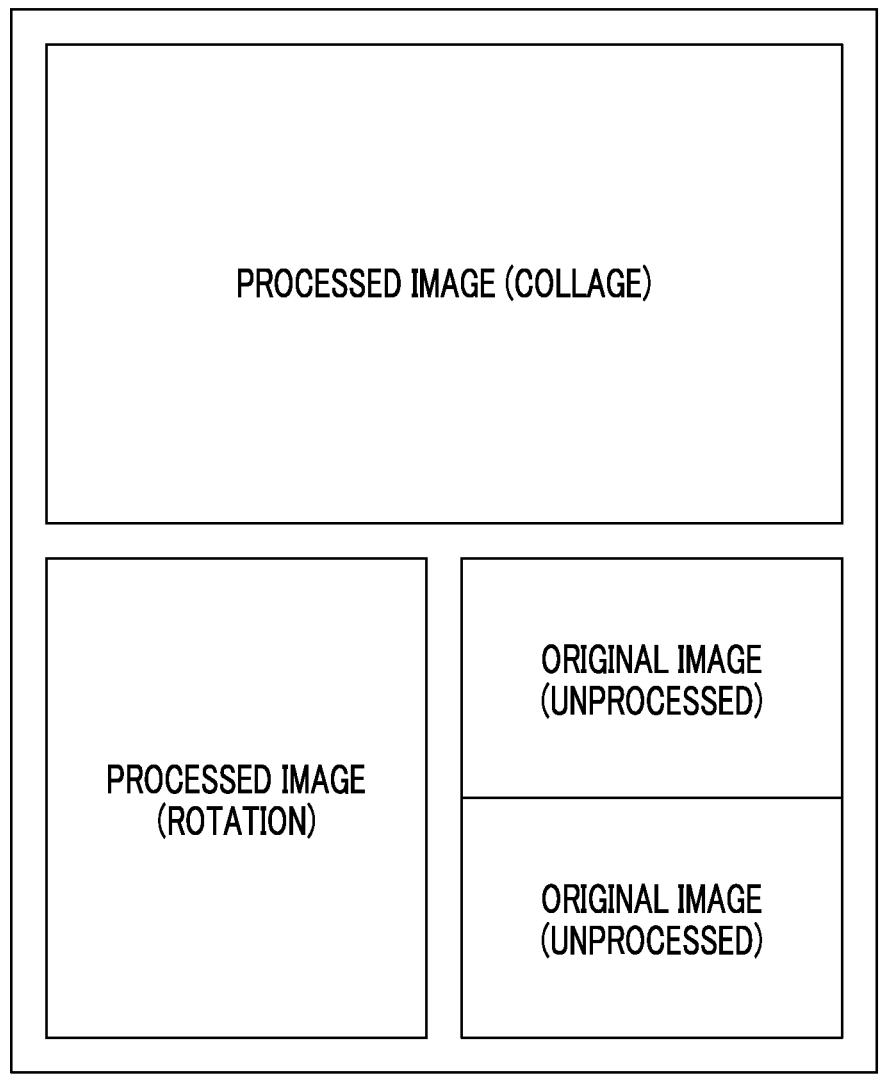
FIG. 10 is a schematic diagram illustrating an example of image used commercial goods created by the image used commercial goods creating apparatus according to the invention.

In Step S14, the arrangement and size determination unit 25 determines at least one of the arrangement and size of the processed image on the basis of the content of processing output from the content of processing judging unit 4, similarly to Embodiment 1, and determines at least one of the arrangement and size of the original image on the basis of the original image data output from the processed image judging unit 23. The arrangement and size of the original image may be determined on the basis of meta information of the original image, for example, the capture date and time of the original image. In addition, at least one of the arrangement and size of the original image may be determined on the basis of at least one of the arrangement and size of the processed image. Specifically, the following method may be considered: as shown in FIG. 10, a processed image created by collaging a plurality of images is determined to be an image which the user has the strongest feelings about and is arranged with the largest size; a processed image created by rotating one original image is determined to be an image which the user has stronger feelings about than an unprocessed image and is arranged with the second largest size smaller than that of the processed image of the collage; and, finally, the unprocessed image is arranged.

Information about the at least one of the arrangement and size of the processed image determined by the arrangement and size determination unit 25 and information about the at least one of the arrangement and size of the original image determined by the arrangement and size determination unit 25 are output together with the processed image data and the original image data to the image layout unit 6 in response to an instruction from the control unit 9.

The image used commercial goods creating apparatus 202 according to Embodiment 3 can use both the processed image and the unprocessed original image for the image used commercial goods. Therefore, it is possible to automatically create desired image used commercial goods in which the user's feelings about the image are appropriately reflected, from the relationship between the original image and the processed image.

The structure using the original image in Embodiment 3 can also be applied to the image used commercial goods creating apparatus 102 considering the date difference in Embodiment 2.

In Embodiments 1 to 3, it is assumed that the image used commercial goods are predetermined. However, for example, appropriate image used commercial goods may be selected on the basis of the content of processing of the processed image, or the content of processing of the processed image and the date difference.

In the image used commercial goods creating apparatus according to the invention, the processed image judging unit judges whether the image data is the processed image or the unprocessed original image and the content of processing judging unit judges the content of processing. However, the image storage device may have these structures, perform the judgment of the processed image and the judgment of the content of processing in advance, and store the information so as to be associated with the image data. This structure may also be applied to Embodiment 2 in which the content of processing judging unit is changed to the date difference and content of processing judging unit. The image storage device may have the structure of the date difference and content of processing judging unit, judge the date difference and the content of processing in advance, and store the information so as to be associated with the image data.

The arrangement and size determination unit of the image used commercial goods creating apparatus according to the invention may determine at least one of the arrangement and size of the processed image and determine the mount corresponding to the processed image. In this case, the image layout unit acquires information about the mount stored in the storage unit through the control unit and changes the mount for laying out the images to the determined mount.

For example, when the image used commercial goods are digital camera prints and the processed image is obtained by processing one image in a sepia tone, the image used commercial goods may be digital camera prints with a white border in order to give a feeling of retrospect.

In addition, the arrangement and size determination unit may use the processed image as the background of the image used commercial goods, that is, the mount of the image used commercial goods.

For example, when the image used commercial goods are postcards and the processed image is obtained by collaging a plurality of images, the processed image of the collage may be used as the entire background of the postcard and the other processed images may be arranged on the background.

The content of processing judging unit may score the content of processing, give a processing score, and judge the content of processing and the arrangement and size determination unit may determine the arrangement and size of the image on the basis of the processing score. For example, the following is considered: the processing score of the unprocessed original image is 0; the processing score is 10 when the processing type is a collage; 5 points are added when the number of original images which is the amount of processing is 5; and the processing score is 1 when the processing type is a rotation.

The scoring of the content of processing makes it possible to create desired image used commercial goods in which the user's feelings about the image are reflected in detail.

Embodiment 4

It is possible to form the processed image judging apparatus according to the invention including the processed image judging unit 3 which judges whether the image data acquired from the image storage device 1 described in Embodiment 1 is a processed image and the content of processing judging unit 4 which judges the content of processing of the processed image when the image data is judged to be the processed image.

Figure 11:
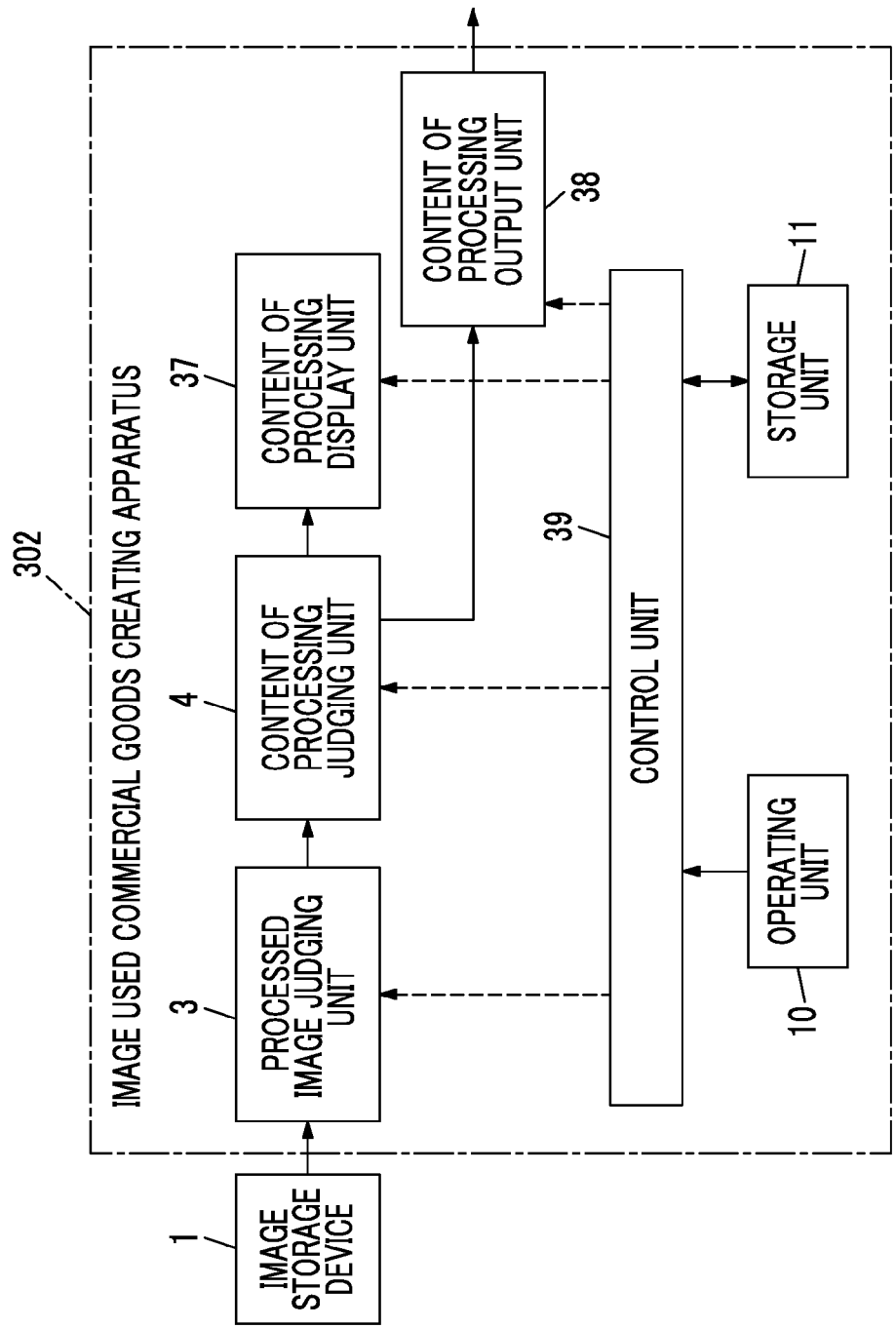
FIG. 11 is a block diagram illustrating a processed image judging system including a processed image judging apparatus according to Embodiment 4 of the invention.

As shown in FIG. 11, a processed image judging apparatus 302 according to Embodiment 4 is connected to the image storage device 1 according to Embodiment 1. The processed image judging apparatus 302 uses the processed image judging unit 3 and the content of processing judging unit 4 of the image used commercial goods creating apparatus 2 according to Embodiment 1 shown in FIG. 1. The processed image judging apparatus 302 includes the processed image judging unit 3, the content of processing judging unit 4, a content of processing display unit 37, and a content of processing output unit 38 which are sequentially connected from the image storage device 1. In addition, a control unit 9 is connected to the above-mentioned units. Similarly to Embodiment 1, an operating unit 10 and a storage unit 11 are connected to the control unit 9. Since the processed image judging unit 3, the content of processing judging unit 4, the control unit 9, the operating unit 10, and the storage unit 11 have the same structures as those according to Embodiment 1, the description thereof will not be repeated. The content of processing display unit 37 and the content of processing output unit 38, which are differences from Embodiment 1, will be described.

Similarly to the display unit 7, shown in FIG. 1, the content of processing display unit 37 is, for example, a liquid crystal display and displays the content of processing judged by the content of processing judging unit 4. In addition, similarly to the display unit 7 shown in FIG. 1, the content of processing display unit 37 may display the processed image based on processed image data together with the content of processing.

The content of processing output unit 38 outputs the content of processing judged by the content of processing judging unit 4 to the outside. In addition, the content of processing output unit 38 may output the processed image data together with the content of processing.

Next, the operation of the processed image judging apparatus 302 according to Embodiment 4 shown in FIG. 11 will be described. As described above, Embodiment 4 differs from Embodiment 1 in the operation of the content of processing display unit 37 and the content of processing output unit 38.

Figure 12:
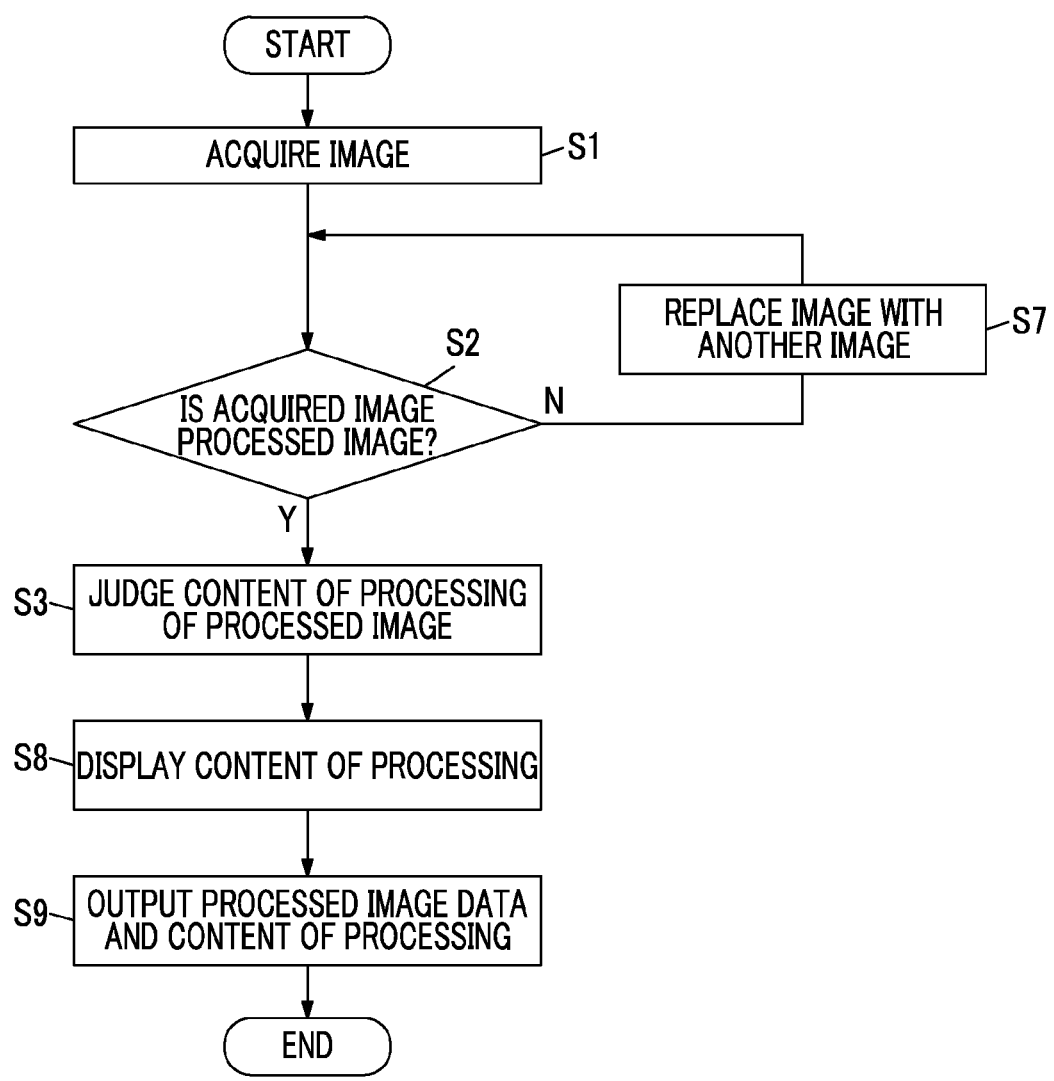
FIG. 12 is a flowchart illustrating a processed image judging flow of the processed image judging apparatus shown in FIG. 11.

As shown in the flowchart of FIG. 12, Steps S1 to S3 and Step S7 related to the acquisition of the image data and the determination of the content of processing are the same as those in Embodiment 1 and thus the description thereof will not be repeated.

In Step S8, the content of processing display unit 37 acquires the content of processing of the processed image from the content of processing judging unit 4 and displays the content of processing, in response to an instruction from the control unit 9. In addition, the content of processing display unit 37 may acquire the processed image data together with the content of processing of the processed image and display the processed image together with the content of processing.

The user checks the content of processing of the processed image displayed on the content of processing display unit 37 and issues an output instruction from the operating unit 10 to the content of processing output unit 38 through the control unit 9. Finally, in Step S9, the content of processing output unit 38 outputs the content of processing in response to an output instruction from the control unit 9. In addition, the content of processing output unit 38 may output the processed image data together with the content of processing.

The processed image judging apparatus 302 according to Embodiment 4 includes the content of processing judging unit 4 and determines the content of processing of the processed image. However, the processed image judging apparatus 302 may include the date difference and content of processing judging unit 14 according to Embodiment 3, instead of the content of processing judging unit 4. In this case, the content of processing display unit 37 acquires the content of processing and a date difference from the date difference and content of processing judging unit 14 and displays the date difference and the content of processing. The content of processing output unit 38 outputs the content of processing and the date difference. Similarly to the above, the content of processing display unit 37 may display the processed image together with the content of processing and the date difference and the content of processing output unit 38 may output the processed image data together with the content of processing and the date difference.

The use of the processed image judging apparatus and a processed image judging method according to the invention makes it possible to appropriately judge the user's feelings about the processed image.

In addition, the image used commercial goods creating apparatus shown in FIG. 1 can be implemented using a computer. That is, the processed image judging unit 3, the content of processing judging unit 4, the arrangement and size determination unit 5, the image layout unit 6, and the control unit 9 can be implemented by a CPU, a memory, and an image used commercial goods creating program for executing each step of the flowchart shown in FIG. 2 and the image used commercial goods creating program can be recorded on a computer-readable recording medium. Various types of recording media, such as a hard disk, a flexible disk, an MO, an MT, a RAM, a CD-ROM, a DVD-ROM, an SD card, a CF card, and a USB memory, can be used as the recording medium.

Similarly, the image used commercial goods creating apparatus shown in FIG. 5 and the processed image judging apparatus shown in FIG. 11 can be implemented by a computer.

The processed image judging apparatus, the processed image judging method, the processed image judging program, and the processed image judging program recording medium, and the image used commercial goods creating apparatus, the image used commercial goods creating method, the image used commercial goods creating program, and the image used commercial goods creating program recording medium according to the invention have been described in detail above. However, the invention is not limited to the above-described embodiments and various modifications and changes of the invention can be made without departing from the scope and spirit of the invention.

What is claimed is:

1. An image used commercial goods creating apparatus comprising:
    a processed image judging unit that judges whether an image used in image used commercial goods is a processed image;
    a content of processing judging unit that judges content of processing of the image which is judged to be the processed image by the processed image judging unit;
    an arrangement and size determination unit that determines at least one of an arrangement and size of the processed image in the image used commercial goods on the basis of the content of processing judged by the content of processing judging unit; and
    an image layout unit that lays out the processed image on the basis of the at least one of the arrangement and size of the processed image determined by the arrangement and size determination unit to create the image used commercial goods, wherein
    the arrangement and size determination unit determines the at least one of the arrangement and size of the processed image on the basis of the content of processing and a date difference which is a difference between a capture date and time of an original image of the processed image and a processing date and time of the processed image.

2. The image used commercial goods creating apparatus according to claim 1,
    wherein the content of processing includes a processing type of the processed image and an amount of processing of the original image of the processed image.

3. The image used commercial goods creating apparatus according to claim 1, further comprising:
    a display unit that displays the created image used commercial goods or an output unit that prints the created image used commercial goods.

4. The image used commercial goods creating apparatus according to claim 2, further comprising:
    a display unit that displays the created image used commercial goods or an output unit that prints the created image used commercial goods.

5. The image used commercial goods creating apparatus according to claim 1,
    wherein the image used commercial goods are photo books, digital camera prints, or postcards.

6. The image used commercial goods creating apparatus according to claim 2,
    wherein the image used commercial goods are photo books, digital camera prints, or postcards.

7. An image used commercial goods creating method comprising:

judging whether an image using in image used commercial goods is a processed image obtained by processing an original image;

judging content of processing of the image which is judged to be the processed image;

determining at least one of an arrangement and size of the processed image in the image used commercial goods on the basis of the content of processing of the processed image; and laying out the processed image on the basis of the determined at least one of the arrangement and size of the processed image to create the image used commercial goods, wherein the at least one of the arrangement and size of the processed image is determined on the basis of the content of processing and a date difference which is a difference between a capture date and time of the original image of the processed image and a processing date and time of the processed image.

8. The image used commercial goods creating method according to claim 7, wherein the content of processing includes a processing type of the processed image and an amount of processing of the original image of the processed image.

9. The image used commercial goods creating method according to claim 7, wherein the image used commercial goods are photo books, digital camera prints, or postcards.

10. The image used commercial goods creating method according to claim 8, wherein the image used commercial goods are photo books, digital camera prints, or postcards.

11. A non-transitory computer-readable recording medium storing an image used commercial goods creating program that causes a computer to perform:

judging whether an image using in image used commercial goods is a processed image obtained by processing an original image;

judging content of processing of the image which is judged to be the processed image;

determining at least one of an arrangement and size of the processed image in the image used commercial goods on the basis of the content of processing of the processed image; and laying out the processed image on the basis of the determined at least one of the arrangement and size of the processed image to create the image used commercial goods, wherein the at least one of the arrangement and size of the processed image is determined on the basis of the content of processing and a date difference which is a difference between a capture date and time of the original image of the processed image and a processing date and time of the processed image.

* * * * *